United States Patent
Smeljanskij et al.

(10) Patent No.: US 12,031,604 B2
(45) Date of Patent: Jul. 9, 2024

(54) VIBRATION DAMPER HAVING A TWO-STAGE RESTRICTED DAMPING FORCE CONTROL

(71) Applicants: thyssenkrupp Bilstein GmbH, Ennepetal (DE); thyssenkrupp AG, Essen (DE)

(72) Inventors: Dmitrij Smeljanskij, Leverkusen (DE); Benjamin Maslowski, Remscheid (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 62 days.

(21) Appl. No.: 17/544,465

(22) Filed: Dec. 7, 2021

(65) Prior Publication Data
US 2022/0178418 A1 Jun. 9, 2022

(30) Foreign Application Priority Data

Dec. 8, 2020 (DE) ...................... 10 2020 215 480.5

(51) Int. Cl.
*F16D 57/00* (2006.01)
*F16F 9/34* (2006.01)
(Continued)

(52) U.S. Cl.
CPC ............. *F16F 9/34* (2013.01); *F16K 17/105* (2013.01); *F16F 9/19* (2013.01); *F16F 9/50* (2013.01); *F16F 2222/12* (2013.01); *F16F 2228/066* (2013.01); *F16F 2230/18* (2013.01); *F16F 2232/08* (2013.01); *F16F 2234/02* (2013.01)

(58) Field of Classification Search
CPC ........ F16F 9/19; F16F 9/34; F16F 9/36; F16F 9/44; F16F 9/50; F16F 2222/12; F16F 2228/066; F16F 2230/18; F16F 2232/08; F16F 2234/02
USPC ......... 188/266.5, 266.6, 282.2, 282.4, 282.6, 188/286, 313, 318, 322.13, 322.15
See application file for complete search history.

(56) References Cited

U.S. PATENT DOCUMENTS 5,501,307 A  3/1996 Lars
5,860,631 A  1/1999 Feigel
(Continued)

FOREIGN PATENT DOCUMENTS

CN  105683612 A  6/2016
CN  111750024 A  10/2020
(Continued)

*Primary Examiner* — Christopher P Schwartz
(74) *Attorney, Agent, or Firm* — thyssenkrupp North America, LLC

(57) ABSTRACT

A controllable vibration damper with damping force control may include a damper tube housing that is filled with damping medium. The controllable vibration damper may also include a damping valve element that is structurally and fluidically connected to the damper tube housing for damping force control. The damping valve element may be configured as a pilot-controlled pressure-limiting valve having a pilot valve. Further, a two-stage pre-throttle valve assembly placed in front of the pilot valve. The damping valve element may be arranged internally with respect to the damper tube housing in some cases. In other cases, the tamping valve element may be arranged externally with respect to the damper tube housing.

11 Claims, 5 Drawing Sheets

(51) Int. Cl.
*F16K 17/10* (2006.01)
*F16F 9/19* (2006.01)
*F16F 9/50* (2006.01)

(56) References Cited

U.S. PATENT DOCUMENTS

| | | | |
|---|---|---|---|
| 6,079,526 | A | 6/2000 | Nezu et al. |
| 6,394,238 | B1 * | 5/2002 | Rogala ................ F16F 9/3484 |
| | | | 188/266.2 |
| 7,273,138 | B2 * | 9/2007 | Park ........................ F16F 9/46 |
| | | | 188/282.3 |
| 7,770,983 | B2 | 8/2010 | Park |
| 8,651,251 | B2 * | 2/2014 | Preukschat .......... B60G 17/056 |
| | | | 188/282.4 |
| 10,508,705 | B2 * | 12/2019 | Funke .................. B60G 17/016 |
| 11,084,350 | B2 * | 8/2021 | Birch .................... B60G 15/06 |
| 11,285,774 | B2 * | 3/2022 | Hamers ................. B60G 13/08 |
| 11,285,775 | B2 * | 3/2022 | Bergfeld ................. F16F 9/19 |
| 2002/0074197 | A1 | 6/2002 | Preukschat et al. |
| 2004/0188200 | A1 | 9/2004 | Katayama et al. |
| 2006/0108190 | A1 | 5/2006 | Forster |
| 2016/0031284 | A1 | 2/2016 | Yamashita et al. |
| 2016/0223043 | A1 | 8/2016 | Hagidaira et al. |
| 2017/0120716 | A1 | 5/2017 | Sakai |
| 2018/0038441 | A1 * | 2/2018 | Smeljanskij ............ F16F 9/465 |
| 2020/0307343 | A1 | 10/2020 | Woenarta |
| 2023/0109503 | A1 | 4/2023 | Awano et al. |

FOREIGN PATENT DOCUMENTS

| | | |
|---|---|---|
| DE | 42 13 803 A1 | 10/1993 |
| DE | 692 24 200 T2 | 5/1998 |
| DE | 10 2015 214 343 A1 | 2/2016 |
| EP | 1215413 A2 | 6/2002 |
| EP | 1 657 469 A1 | 5/2006 |
| EP | 1 995 489 A2 | 11/2008 |
| JP | 2014-031856 A | 2/2014 |
| JP | 2015158044 A | 9/2015 |
| WO | 2020/179676 A1 | 9/2020 |

\* cited by examiner

VIBRATION DAMPER HAVING A TWO-STAGE RESTRICTED DAMPING FORCE CONTROL

CROSS REFERENCE TO RELATED APPLICATIONS

This application is a U.S. Non-Provisional application that claims priority to German Patent Application No. DE 10 2020 215 480.5, filed Dec. 8, 2020, the entire contents of which are incorporated herein by reference.

FIELD

The present disclosure generally relates to controllable vibration dampers having damping force control, including such dampers with a damper tube housing filled with damping medium and a damping valve element that is structurally and fluidically connected to the damper tube housing for damping force control and that is configured as a pilot-controlled pressure-limiting valve having a pilot valve.

BACKGROUND

Conventionally, in a pilot-controlled pressure-limiting valve, a pre-throttle valve having a fixed cross section is placed in front of the pilot valve, but the design of this pre-throttle valve is always a compromise. The conflict of goals in this case results from the fact that, to achieve the desired lowering of the soft characteristic curve, a pre-throttle valve having high hydraulic resistance is advantageous, whereas for good valve stability with harder damping characteristics and for rapid switching times, a lower hydraulic resistance is advantageous. Therefore it would be desirable to lower the soft characteristic curve while simultaneously improving stability and reducing the switching time while maintaining the same spread of the pressure-limiting valve.

Thus a need exists for a pressure-limiting valve that tackles the conflict of goals illustrated above by means of better functional properties.

DETAILED DESCRIPTION

Figure 1:
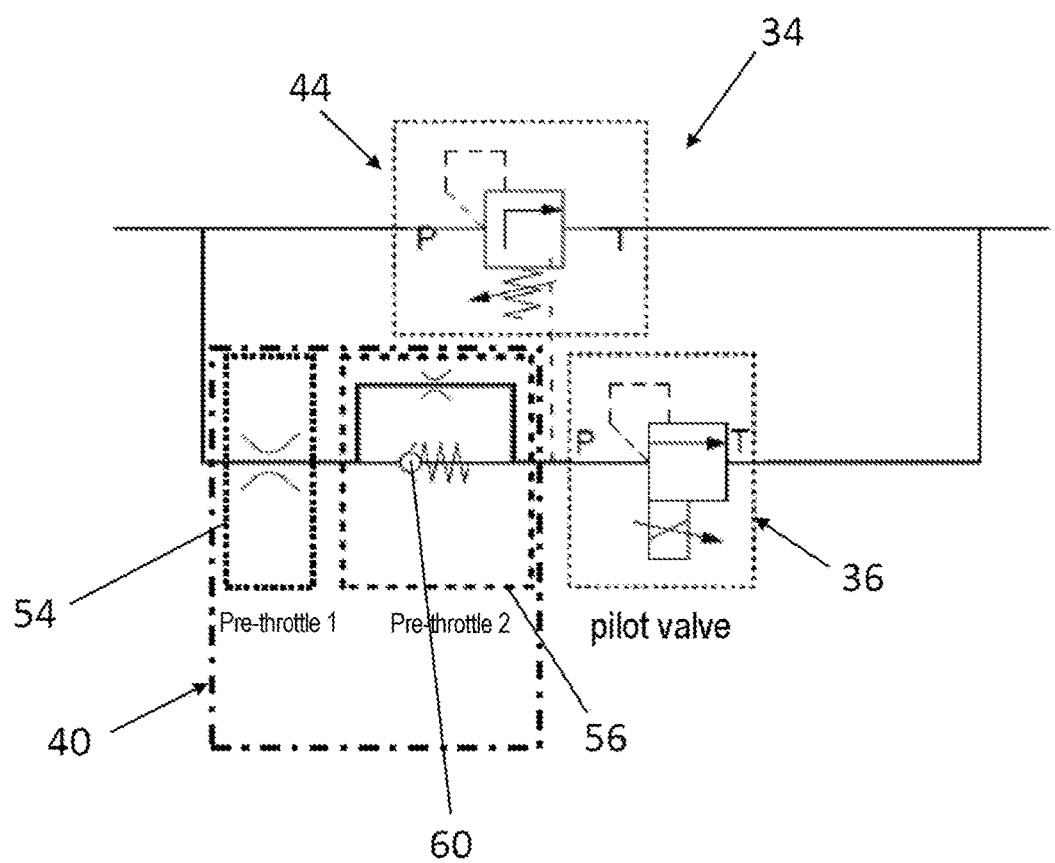
FIG. 1 is a hydraulic circuit diagram of an example pressure-limiting valve.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a controllable vibration damper may have a damping force control, comprising a damper tube housing filled with damping medium and a damping valve element which is structurally and fluidically connected to the damper tube housing for damping force control, the damping valve element being in the form of a pilot-controlled pressure-limiting valve having a pilot valve, wherein a two-stage pre-throttle valve assembly is placed in front of the pilot valve.

By means of the pressure-limiting valve of the vibration damper according to the present disclosure, it is possible to vary the hydraulic resistance of the pre-throttle valve assembly according to the pilot pressure. Using the two-stage pre-throttle valve assembly, by means of a high hydraulic resistance connected in series, the pilot volume flow rate can be reduced for low pilot pressures within the range of the soft characteristic and with low main volume flow rates. By reducing the total hydraulic resistance of the pre-throttle valves, the pilot volume flow can be increased for high pilot pressures within the range of the hard characteristic. In addition, the transition behaviour between the two restrictions can be adjusted by means of the bias and the rigidity of the individual valve components.

One embodiment of the present disclosure provides that a pre-throttle valve of the restriction assembly is in the form of a switchable pre-throttle valve. It is thus possible to vary the pilot volume flow for high pilot pressures according to the pilot pressure in a controlled manner. Alternatively, it can also be provided that the first and the second pre-throttle valve are each in the form of a switchable valve.

One embodiment of the present disclosure provides that at least one of the pre-throttle valves, in an unswitched, closed state, has a higher hydraulic resistance than the pre-throttle valve placed in series. In this case, the term closed state does not necessarily mean a fluidically sealed or closed state, but rather a closed state in terms of circuitry. In particular, it is provided that the open, switchable restriction valve has the maximum hydraulic resistance of the non-switchable restriction valve. One of the pre-throttle valves can consist in particular of two flow ducts extending in parallel, the one flow duct containing a fixed throttle, and the other flow duct containing a spring-loaded valve element, the valve element being loaded by the spring element thereof in the unswitched, closed state. The pilot pressure counteracts the force of the spring element so that, from a certain pilot pressure, the valve element of the second restriction switches and moves towards an open state.

One embodiment of the present disclosure provides that the first and/or the second pre-throttle valve of the pre-throttle valve assembly have a variable hydraulic resistance. One embodiment of the present disclosure provides that at least one of the pre-throttle valves of the pre-throttle valve assembly has a variable flow cross section.

One embodiment of the present disclosure provides that at least one of the pre-throttle valves of the pre-throttle valve assembly can be adjusted in terms of the cross-sectional dimension thereof in each case. In particular, the bias and the rigidity can be adjusted. The damping characteristics and in particular the transition behaviour between the two pre-throttle valves of the pre-throttle valve assembly can thereby be adjusted. In this case, linear, progressive or degressive characteristics can be adjusted.

Figure 2:
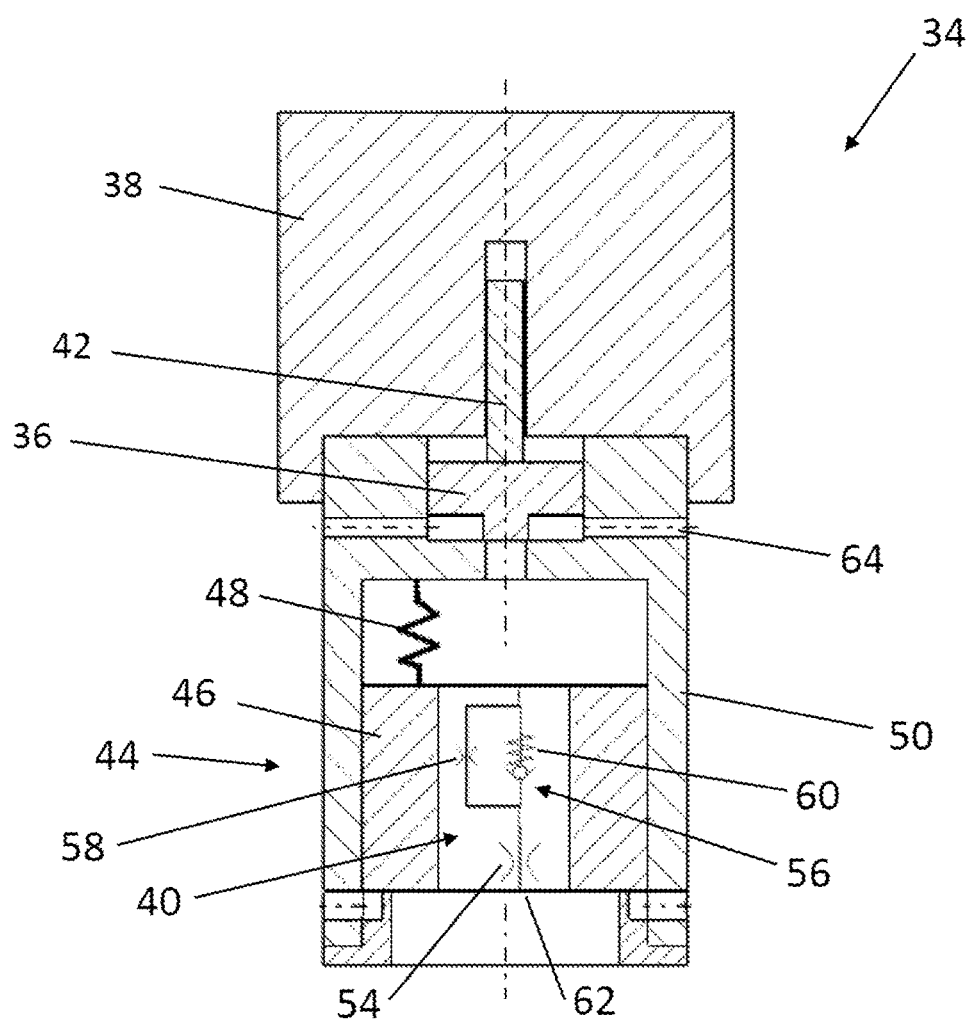
FIG. 2 is a schematic view of a pilot-controlled pressure-limiting valve having a two-stage pre-throttle valve assembly.

FIG. 1 shows a hydraulic circuit diagram of a pressure-limiting valve 34 according to the present disclosure. FIG. 2 shows a pilot-controlled pressure-limiting valve 34 according to the present disclosure having a two-stage pre-throttle valve assembly 40. FIGS. 1 and 2 will be described together in the following. The pressure-limiting valve 34 comprises a pilot valve 36 which can be switched by means of an electromagnetic force adjuster 38. By means of an anchor rod 42, the pilot valve 36 interacts with the force adjuster 38. The main valve stage 44 is placed in parallel with the pilot valve 36, which basically comprises a piston 46 and a spring element 48. The pilot valve 36, the piston 46 and the spring element 48 are held in a valve housing 50. The volume inside the valve housing 50 is fluidically connected by means of an intake 62 and a drain 64 in each case to a working space 22 of a vibration damper 10 which is to be described in greater detail. In this case, this fluidic connection can be stopped or released by the piston 46 in that the piston 46 carries out a piston sliding movement inside the valve housing 50.

By reference to the details in FIG. 2, it can be seen that the piston 46 can carry the two-stage pre-throttle valve assembly 40. The pre-throttle valve assembly 40 consists firstly of a fixed pre-throttle valve 54 which, in the simplest case, can consist of a bore hole inside the piston 46. Another switchable pre-throttle valve 56 is arranged in series with the fixed pre-throttle valve 54. The switchable pre-throttle valve 56 comprises two flow ducts extending in parallel, the one flow duct containing a fixed throttle 58, and the second flow duct containing a spring-loaded valve element 60, the valve element 60 being loaded by the spring element thereof in the unswitched, closed state.

Figure 3:
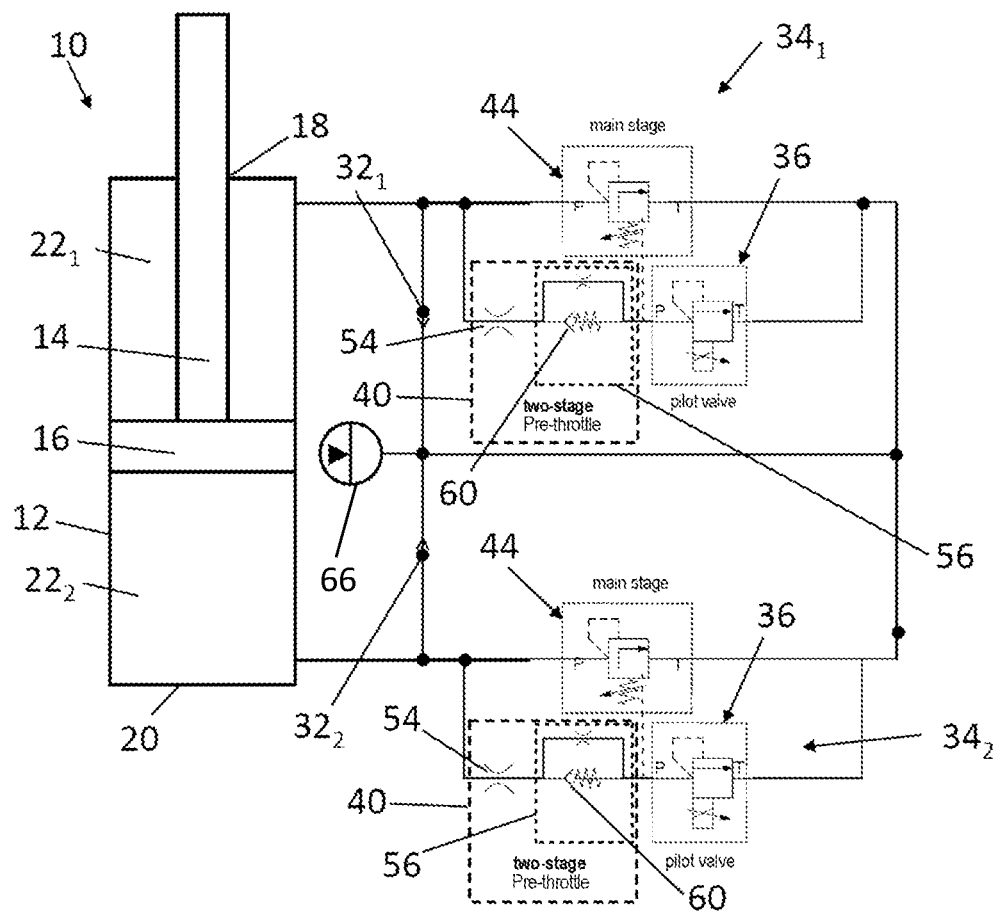
FIG. 3 is a schematic, sectional view of a vibration damper in a first basic circuit with an adjustable damping force.

FIG. 3 is a general, sectional view of a vibration damper 10 with an adjustable damping force. The vibration damper 10 comprises a damping-medium-filled damper tube housing 12, in which a piston 16 attached to a piston rod 14 is guided in an axially movable manner. The direction of movement of the piston 16 can be defined as a longitudinal direction of the vibration damper 10. The upper end of the damper tube housing 28 is closed by a piston rod guide 18, and the lower end of the damper tube housing 28 is closed by a base which can be in the form of a base valve body. A working space 22 is formed in the damper tube housing 12. The piston divides the working space 22 into a piston-rod-side working space $22_1$ and a piston-rod-remote working space $22_2$.

Furthermore, the vibration damper 10 can also have two damping valve elements $34_1$, $34_2$ which are each adjustable. The damping valve elements $34_1$, $34_2$ are regularly in the form of pressure-limiting valves. The damping valve elements $34_1$, $34_2$ can be operatively connected to the piston-rod-side working space $22_1$ and the piston-rod-remote working space $22_2$ for each one of the piston movements. The damping valve elements $34_1$, $34_2$ can be held or arranged on or in the damper tube housing 12. The damping valve element $34_1$ is used to damp the extending movement of the piston rod 14 or of the piston 16 in the rebound, and the damping valve element $34_2$ is used to damp the retracting movement of the piston rod 14 or of the piston 16 in the compression of the vibration damper 10. In an alternative embodiment (not shown here), the two damping valve elements $34_1$, $34_2$ can also be received in a single housing held on the external damper tube housing 12 but otherwise have the function described here.

FIG. 3 shows an embodiment of the vibration damper 10 in one possible basic circuit. The overflow of the hydraulic fluid between the piston-rod-side working space 22 and the piston-rod-remote working space 22 takes place in this case by means of respective non-return valves $32_1$, $32_2$ in front of the pressure-limiting elements $34_1$, $34_2$.

Figure 4:
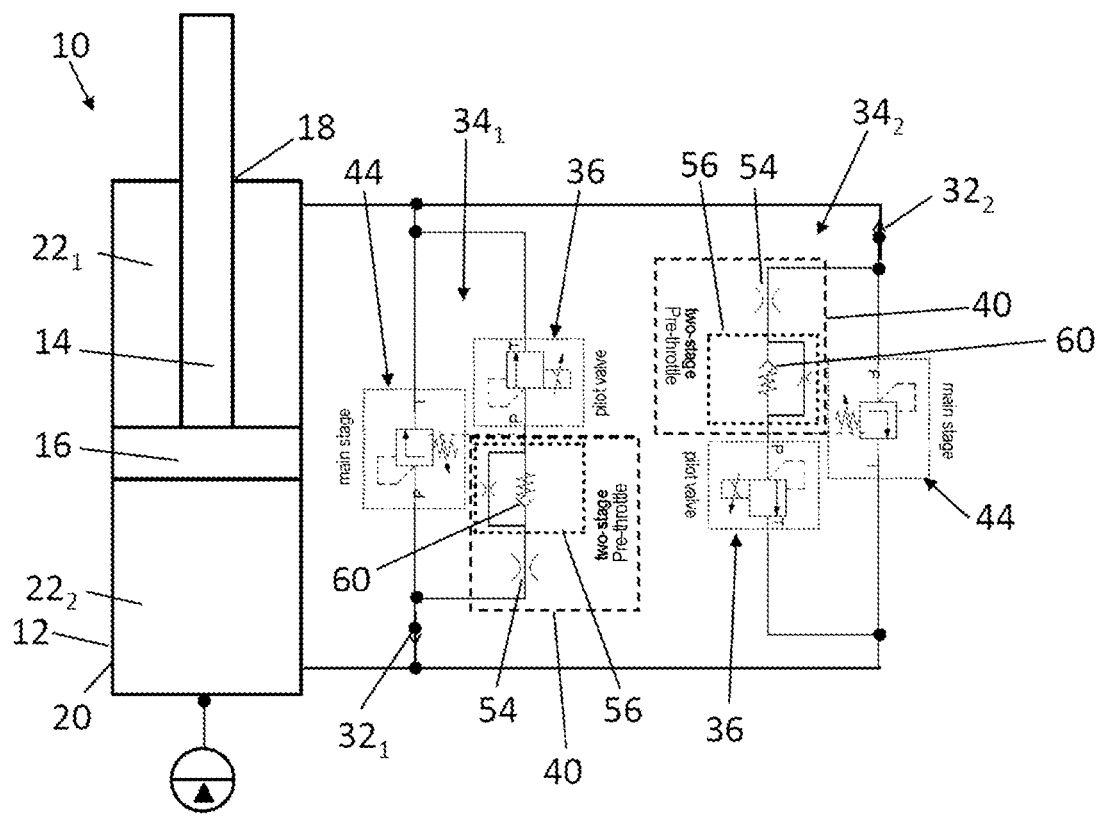
FIG. 4 is a schematic, sectional view of a vibration damper in another basic circuit with an adjustable damping force.

FIG. 4 shows an embodiment of the vibration damper 10 in another possible basic circuit. The hydraulic arrangement of the compensating chamber is configured according to EP 12 154 13 B1.

Figure 5:
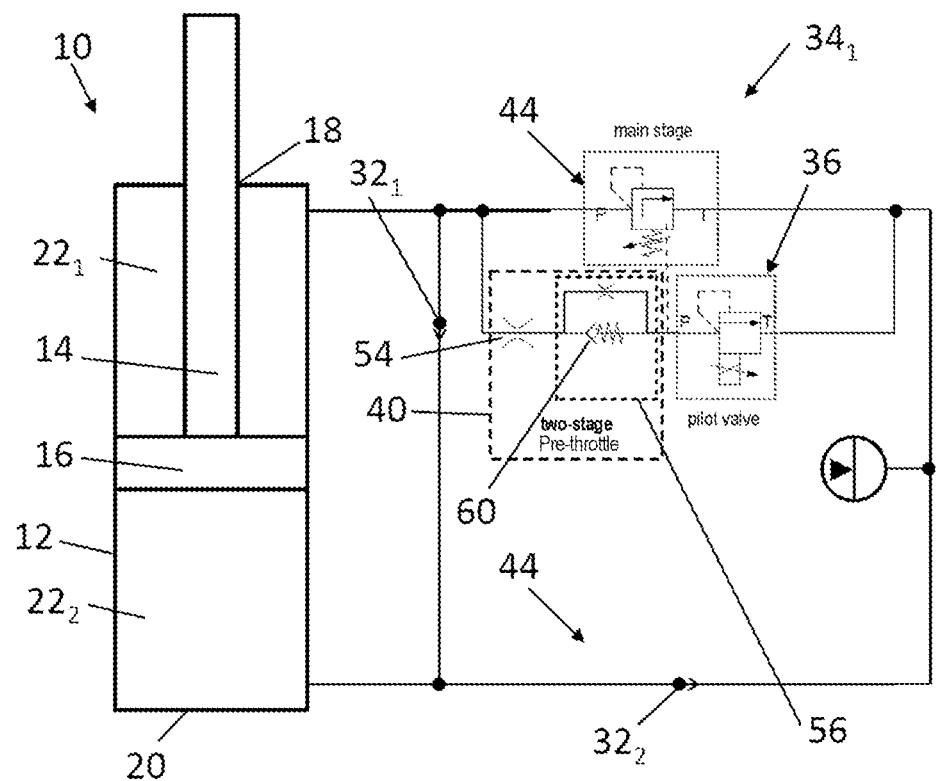
FIG. 5 is schematic, sectional view of a vibration damper in another basic circuit with an adjustable damping force.

FIG. 5 shows an embodiment of the vibration damper 10 shown, the basic circuit of which corresponds to what is known as a uniflow circuit.

LIST OF REFERENCE NUMERALS 10 vibration damper
12 damper tube housing
14 piston rod
16 piston
18 piston rod guide
20 base
22 working space
32 non-return valve
34 damping valve element
36 pilot valve
38 force adjuster
40 pre-throttle valve assembly
42 anchor rod
44 main valve stage
46 piston
48 spring element
50 valve housing
54 pre-throttle valve
56 pre-throttle valve
58 fixed throttle
60 valve element
62 intake
64 Drain
66 Accumulator

What is claimed is:

1. A controllable vibration damper having damping force control, the controllable vibration damper comprising:
   a damper tube housing filled with damping medium; and
   a damping valve element that is structurally and fluidically connected to the damper tube housing for damping force control, the damping valve element having a two-stage pre-throttle valve assembly having a fixed pre-throttle valve disposed in series with a switchable pre-throttle valve as part of the two-stage pre-throttle valve placed in front of and in series with a pilot valve.

2. The vibration damper of claim 1 wherein the switchable pre-throttle valve has a variable hydraulic resistance.

3. The vibration damper of claim 2 wherein the two-stage pre-throttle valve assembly has a variable hydraulic resistance.

4. The vibration damper of claim 3 wherein the two-stage pre-throttle valve assembly includes a variable flow cross-section.

5. The vibration damper of claim 2 wherein a cross-sectional dimension of the switchable pre-throttle valve is adjustable.

6. The vibration damper of claim 1 wherein the fixed pre-throttle valve and/or the switchable pre-throttle valve pre-throttle valve of the two-stage pre-throttle valve assembly includes a variable hydraulic resistance.

7. The vibration damper of claim 6 wherein the fixed pre-throttle valve and/or the switchable pre-throttle valve pre-throttle valve of the two-stage pre-throttle valve assembly includes a variable flow cross-section.

8. The vibration damper of claim 1 wherein the damping valve element is arranged internally with respect to the damper tube housing.

9. The vibration damper of claim 1 wherein the damping valve element is arranged externally with respect to the damper tube housing.

10. The vibration damper of claim 1 wherein in an unswitched, closed state the switchable pre-throttle valve has a smaller opening area than the fixed pre-throttle valve.

11. The vibration damper of claim 1, further comprising a second a two-stage pre-throttle valve assembly having a corresponding fixed pre-throttle valve disposed in series with a corresponding switchable pre-throttle valve as part of the second two-stage pre-throttle valve placed in front of and in series with a corresponding pilot valve.

\* \* \* \* \*